Dec. 25, 1945.  W. E. WINN  2,391,761

PIPE JOINT

Filed Jan. 27, 1944

W. E. Winn
INVENTOR.

BY
C. A. Snow & Co.
ATTORNEYS.

UNITED STATES PATENT OFFICE 2,391,761

PIPE JOINT

Willis E. Winn, Huntington, Ind.

Application January 27, 1944, Serial No. 519,915

1 Claim. (Cl. 285—185)

This invention aims to provide novel means for holding telescoped pipe sections together, after they have been adjusted longitudinally, the device being of peculiar utility in connection with setting up stove pipes, although the invention by no means is confined to that use.

A further object of the invention is to provide a device of the class referred to, in which a screw serves not only to punch the pipes, for its own admission, but, as well, serves as a means for restoring the inner pipe sections to cylindrical form, although that section may have been bulged inwardly by the piercing operation of the screw.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
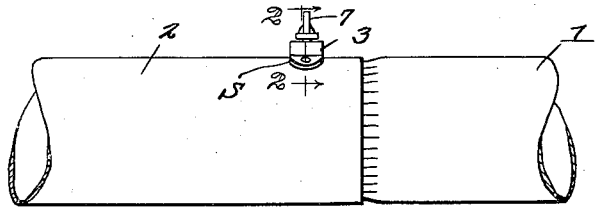
Fig. 1 shows, in side elevation, a pipe joint constructed in accordance with the invention.

In the drawing, there is shown a pipe joint, comprising telescoped inner and outer pipe sections, denoted by the numerals 1 and 2, respectively. A saddle S is secured to the outer section 2, transversely thereof, the saddle including an inverted U-shaped body 3.

The numeral 4 marks a screw, equipped with a foot 5 of such taper as to form a pipe-punch. The screw 4 has a thread 6 which engages the body 3 of the saddle S, to advance the screw and operate the pipe-punch 5, when the screw is rotated.

Figure 5:
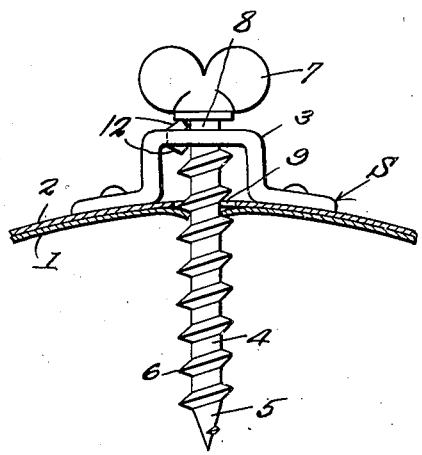
Fig. 5 is a section on the line 2—2 of Fig. 1, the view showing the parts as they will appear after the head of the screw has engaged the saddle, and after the inner pipe section has been restored to contact with the outer pipe section.

The screw 4 has a laterally-extended head 7, the thread 6 terminating in spaced relation to the head, thereby forming, upon the screw, a smooth portion 8, freely rotatable in the body 3 of the saddle S, with the head 7 in engagement with the body of the saddle, as shown in Fig. 5.

Figure 2:
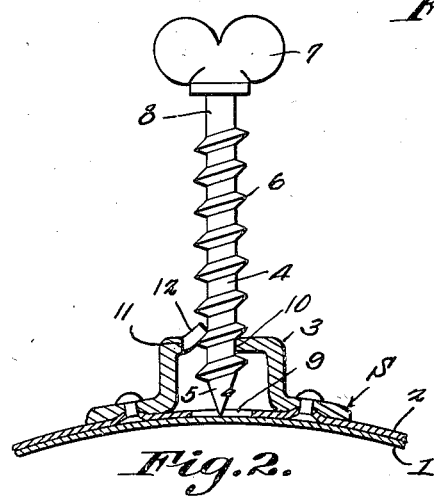
Fig. 2 is a section on the line 2—2 of Fig. 1, the screw being in the position which it will assume as it comes into contact with the inner pipe section.
Figure 3:
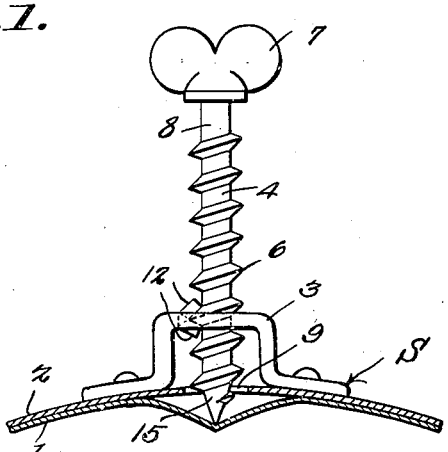
Fig. 3 is a section on the line 2—2 of Fig. 1, the view showing the parts as they will appear when the screw has been advanced from the position of Fig. 2, to cause the screw to begin its piercing operation.
Figure 4:
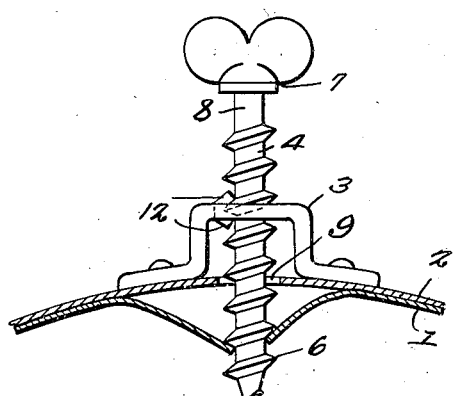
Fig. 4 is a section on the line 2—2 of Fig. 1, the view showing the parts as they will appear after the screw has penetrated the inner pipe section.

When the screw 4 is advanced, it first touches the inner section 1, as shown in Fig. 2, then bulges a portion of the inner section inwardly, as shown in Fig. 3, and finally passes through the inner section, as shown in Fig. 4. When the screw 4 is rotated, with the head 7 in engagement with the saddle, the thread 6 constitutes means for drawing outwardly, so much of the inner pipe section 1 as may have been bulged inwardly, during the operation of the pipe-punch or foot 5.

The pipe joint is further characterized by the fact that the outer pipe section 2 has a hole 9, which is so located and of such diameter as to permit the screw 4 to pass freely through it, thereby preventing an inward bulging of the outer section 2.

Figure 6:
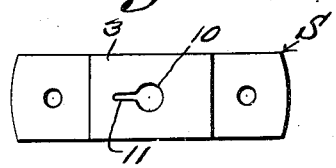
Fig. 6 is a top plan of the saddle.

Referring to Fig. 6, the body of the saddle S has an opening 10, shaped for the reception of the screw 4, the opening having a lateral, slotlike extension 11, shaped for the reception of the threaded 6, the thread constituting means for spreading portions of the saddle in opposite directions, to form a thread receiving, V-shaped seat 12, when the rotation of the screw is initiated.

When the screw is advanced to the position of Fig. 5, the head of the screw may engage the upper portion of the seat 12, but since the seat is part of the saddle S, the head may be said to engage the saddle.

When the parts are in the position of Fig. 5, the sections 1 and 2 are securely held against relative longitudinal movement, owing to the position of the screw 4. The sections 1 and 2 may be telescoped as much as desired, but the screw 4 will always be available to hold them together, as in Fig. 5.

What is claimed is:

In a pipe joint, telescoped inner and outer pipe sections, a saddle secured to the outer section, and a screw equipped with a foot of such taper as to form a pipe-punch, the screw having a thread which engages the saddle, to advance the screw and operate the pipe-punch when the screw is rotated, the screw having a laterally-extended head, the thread terminating in spaced relation to the head, whereby the screw may be rotated freely, with the head in engagement with the saddle, the thread then constituting means for drawing outwardly, so much of the pipe material as may have been bulged inwardly during the operation of the pipe-punch, the saddle having an opening, shaped for the reception of the screw, the opening having a lateral, slot-like extension shaped for the reception of the thread, the thread constituting means for spreading portions of the saddle in opposite directions, to form a thread-receiving seat, when the rotation of the screw is initiated.

WILLIS E. WINN.